E. PEMBERTON.
CURING APPARATUS.
APPLICATION FILED JAN. 21, 1919.

1,370,222.

Patented Mar. 1, 1921
2 SHEETS—SHEET 1.

INVENTOR.
Elmer Pemberton
BY
R. S. Berry
ATTORNEY.

E. PEMBERTON.
CURING APPARATUS.
APPLICATION FILED JAN. 21, 1919.
1,370,222.
Patented Mar. 1, 1921.
2 SHEETS—SHEET 2.
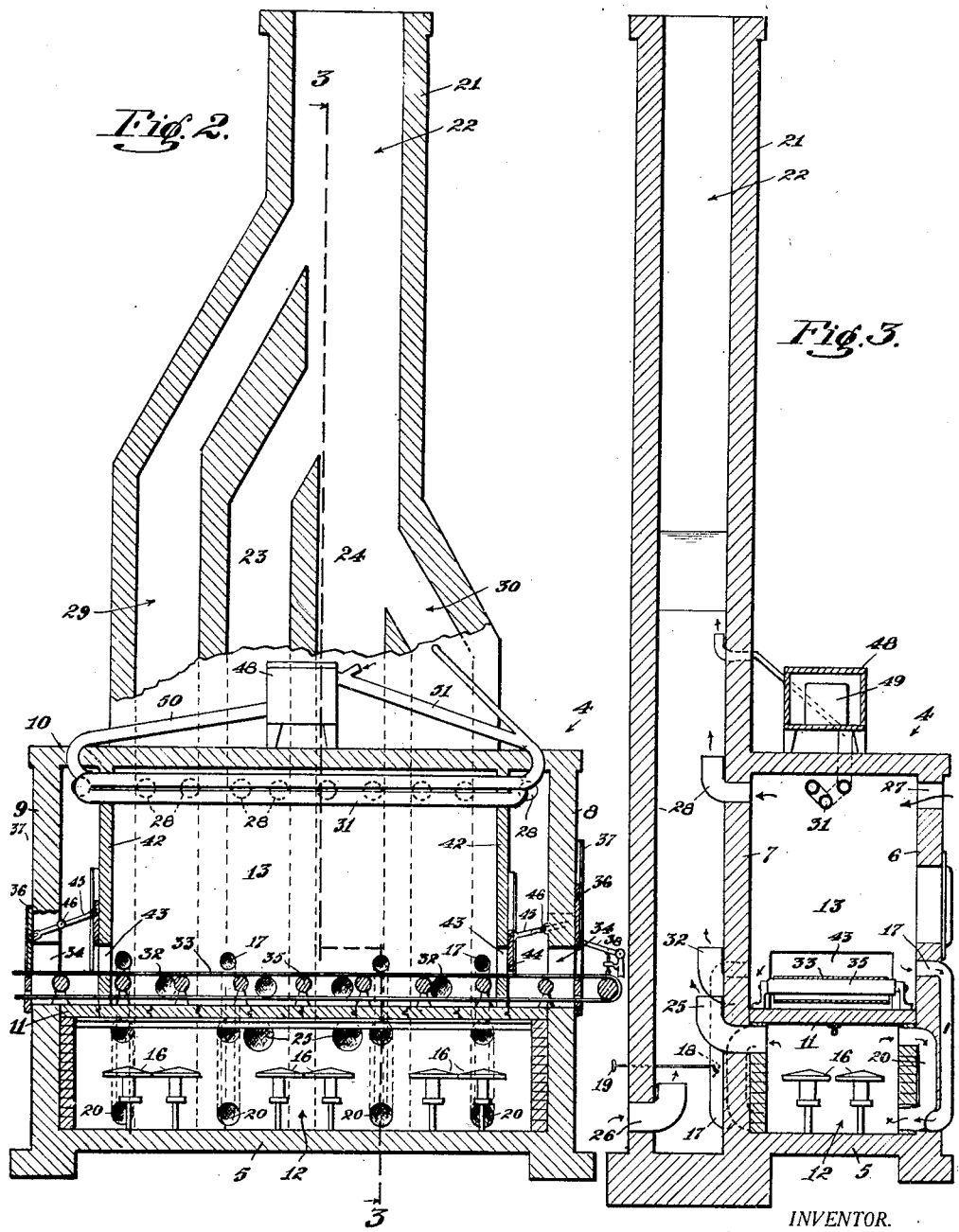
INVENTOR.
Elmer Pemberton;
BY
R. S. Berry
ATTORNEY.

UNITED STATES PATENT OFFICE.

ELMER PEMBERTON, OF HYDE PARK, CALIFORNIA.

CURING APPARATUS.

1,370,222.  Specification of Letters Patent.  Patented Mar. 1, 1921.

Application filed January 21, 1919. Serial No. 272,276.

*To all whom it may concern:*

Be it known that I, ELMER PEMBERTON, a citizen of the United States, residing at Hyde Park, in the county of Los Angeles and State of California, have invented new and useful Improvements in Curing Apparatus, of which the following is a specification.

This invention relates to a process and apparatus for curing fruits, vegetables, meats and other articles, and particularly pertains to an oven construction and draft induction means embodied therewith.

It is the object of this invention to provide a curing apparatus which is so constructed and arranged that the curing operation will be effected by the combined action of heat and currents of air and moisture in such manner as to effect exudation of the water element of the article being treated without destroying or materially changing its other natural characteristics, such as flavor and color.

In the ordinary artificial drying, dehydrating and evaporating processes now generally in use it is customary to subject the article being treated to the action of heat and dry air. In these processes employing dry air, while a preservative effect is obtained, the warm dry air not only acts to draw or evaporate the moisture from the articles being treated but also removes natural flavors because the flavor bearing constituents are usually capable of being volatilized on being subjected to a dry heat and accordingly become incorporated with the products of evaporation. This is evidenced by the well known material change in the flavor of dried or evaporated peaches and apricots from the natural flavor of the ripe fruit. A change in taste is found in substantially all dried articles of diet. It is therefore desirable to retain the natural flavors and I have found that this can be accomplished as before stated by effecting the curing action in the presence of precipitating moisture, heat and difference of temperature. In carrying out my process it is essential that the heat and moisture be properly proportioned in relation to each other, as the presence of excess moisture causes a cooking action while the lack of moisture causes liberation of the flavor element as before mentioned. A further object of this invention therefore is to provide an apparatus whereby the proper relative proportions of heat, difference of temperature and moisture may be supplied. Other objects will appear hereinafter.

The invention is illustrated in the accompanying drawings, in which;

Fig. 2 is a view in longitudinal section and elevation.

Fig. 3 is a view in cross section and elevation as seen on the line 3—3 of Fig. 2.

Figure 1:
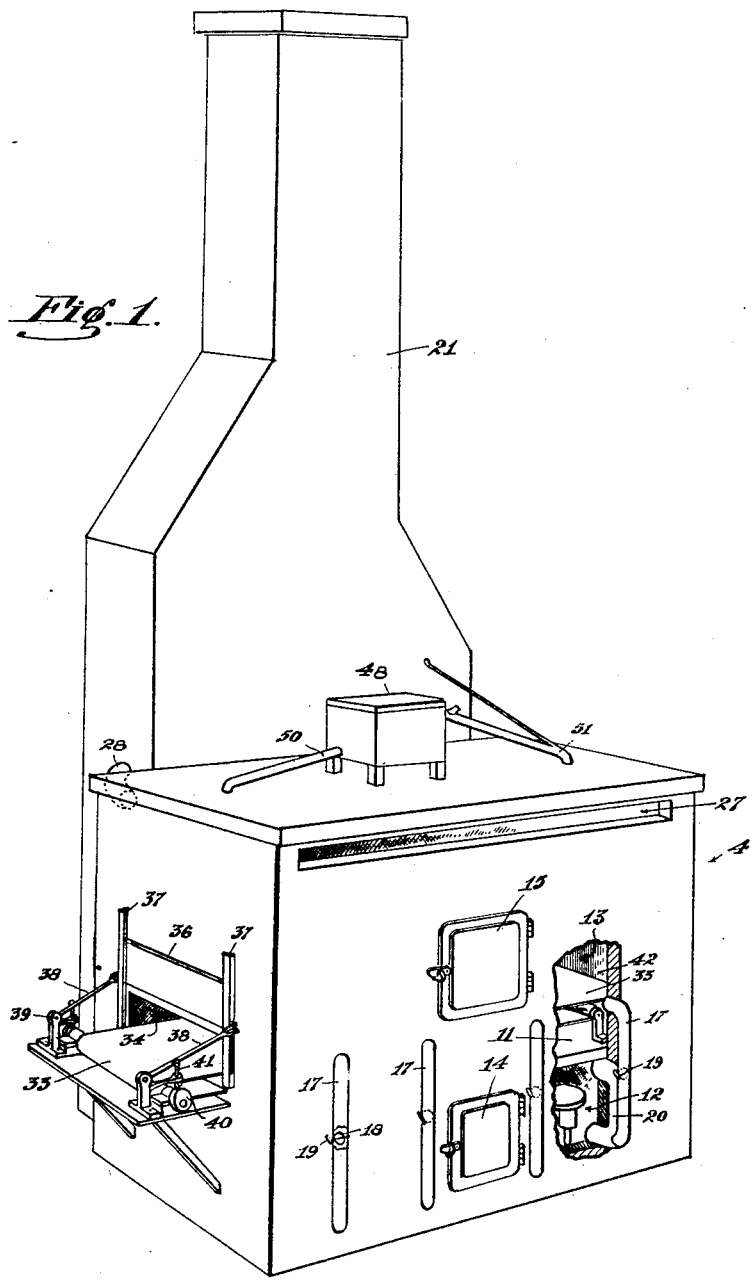
Figure 1 is a perspective view of the curing apparatus with parts broken away to show interior portions thereof.

More specifically 4 indicates an oven housing consisting of a bottom wall 5, front and rear side walls 6 and 7, end walls 8 and 9, and a top wall 10. An imperforate floor 11 spaced above the bottom wall divides the space within the housing into a heating chamber 12 and a curing compartment 13 to each of which access may be had through doors 14 and 15. Any suitable means may be employed for generating heat in the heating chamber, gas burners 16 being here shown for this purpose. The heating chamber is closed against direct admission of outside air and such air as is necessary to support combustion in the heating chamber is delivered thereto solely from the lower portion of the curing compartment through a series of preheating conduits 17 which open at their upper ends to said compartment through the side walls thereof adjacent to the floor 11 and open at their lower ends to the heating chamber adjacent to the bottom wall thereof. Dampers 18 are provided in the conduits 17 for adjusting the sectional area of the conduits and for regulating the volume of air supplied to the heating chamber, the dampers being provided with handles 19 for disposing the dampers in various positions. A series of superheating tubes 20 are arranged in the walls of the heating chamber and open at their upper ends to the chamber immediately beneath the floor 11, and open at their lower ends just above the bottom wall 12 to the lower portions of which the conduits connect, these tubes serving to deliver heated air or products of combustion from the upper portion of the heating chamber to the lower portion thereof so as to preheat the air entering the chamber through the conduits and thereby facilitate combustion.

A chimney 21 is erected adjacent to the rear side wall 7 and is formed with a smoke flue 22 which has a single outlet at the chimney top and is divided at its lower portion into a series of separate smoke flues according to the length of the apparatus and here shown as two in number indicated at 23 and 24. These smoke flues open a short distance above their lower ends to the heating chamber through upturned elbows 25 leading into the upper portion of the chamber immediately beneath the floor 11 and serve as outlets for products of combustion from the heating chamber. Cold air inlets 26 are provided in the lower portion of the outside walls of the smoke flues below the elbows to facilitate updrafts in the flues.

The curing compartment is provided with a fresh air inlet 27 in its upper portion which is here shown as comprising a longitudinally extending slot formed in the front side wall immediately below the top wall and which slot extends substantially throughout the length of the compartment. Formed in the rear side wall opposite the air inlet is a series of outlets 28 some of which open to the smoke flues and others open to vent ducts 29 and 30 formed in the chimney and which ducts lead and open into the smoke flue at points below the upper end of the latter so that heat rising in the smoke flue will act to induce draft in the vent ducts and thereby cause a current of cold air to flow across the upper portion of the curing compartment, a portion of which will pass through the outlets 28 into the smoke ducts and another portion into the vent ducts. A series of cooling pipes 31 may be interposed between the air inlet and vents through which a cooling medium may be passed to cool the incoming fresh air where the normal outside air is not sufficiently cool to have the desired chilling action in the upper portion of the compartment.

In order to effect a down-draft in the curing compartment and at the same time remove excess moisture from the lower portion thereof outlets 32 are provided leading from the compartment into the vent ducts and smoke flues at a point immediately above the floor 11. The conduits 17 coöperate with the outlets 32 in creating the down-draft.

The articles to be cured may be placed in and removed from the curing compartment in any desired manner but for convenience and economy of operation it is desirable to employ an endless conveyer 33 as here shown. This conveyer passes through openings 34 in the end walls and is supported on rollers 35 adjacent to the floor 11, and may be driven in any desired manner so as to have intermittent movement. The openings 34 are fitted with automatically operated vertically slidable doors 36 carried in guide channels 37 and adapted to be intermittently opened and closed by mechanism operating coincidently with the movement of the conveyer. This mechanism is here shown as consisting of rocker arms 38 pivoted to standards at 39 and having pin and slot connections with the doors. Cams 40 on the end rollers 33 act on vertically guided links 41 connected to the arms in such manner as to move the latter and the doors vertically at certain intervals.

As a means for effecting a more complete closure at the ends of the curing compartment a partition 42 is disposed a short distance from each end wall having openings 43 through which the conveyer passes and which openings are fitted with vertically slidable doors 44 connected to the outer doors by levers 45 pivoted at 46 and adapted on vertical movement of the outer doors to move the inner doors in an opposite direction in such manner that when the outer doors are open the inner doors will be closed.

The operation of the invention is as follows:

On heat being generated in the heating chamber by the burners 16 or by any other suitable means, hot products of combustion or hot air will flow from the heating chamber into the smoke flues 23 and 24 and rising in the latter will be discharged at the chimney top. Oxygen laden air for displacing that discharged from the heating chamber and for supporting combustion is drawn into the heating chamber solely from the lower portion of the curing compartment through the conduits 17. As the air inlet to the curing compartment is disposed in the upper portion thereof the drawing of air from its lower portion effects a down-draft therein of cold moisture-laden air. This down-draft is however, augmented by the fact that the cold air has a natural tendency to pass downward in the cooling compartment and into the air outlets in the lower portion thereof. Down-draft is further augmented in the curing compartment by the action of the rising heat in the smoke flues on the cooler air within the vent ducts as heat in the flues warms the air in the ducts and particularly at the outlets of the latter at their communication with the flues and causes air to flow upwardly from the ducts which is displaced by moisture-laden air drawn into the ducts from the lower portion of the curing chamber.

The floor of the curing compartment becoming heated, heat will rise therefrom causing hot moisture-laden air to pass upwardly in the compartment and come into intimate contact with the cold moisture-laden air passed downwardly by the down-draft and with the cold air passing across the upper portion of the compartment. This contact of warm moisture-laden air with cold moisture-laden air causes condensation of moisture so that the air in the lower portion of the curing chamber will be heavily charged with moisture. As an excess of moisture is undesirable because of its causing a cooking action the function of the vent ducts is important in that by their operation excess moisture may be removed. The action of the vent ducts as to the volume of moisture drawn from the compartment is governed largely by the relative temperature of the contents of the smoke flue which is again determined by the amount of heat generated in the heating chamber and which in turn is regulated by the dampers in the air feed conduits 17 and the usual fuel feed control devices not here shown. When the heat generation is adjusted the amount of moisture condensed in the curing compartment will be automatically controlled and will be substantially uniform particularly where the cooling pipes are employed to obtain an approximately uniform temperature in the upper portion of the curing compartment. Any suitable means may be employed for circulating a cooling medium through the cooling pipe 31 but in rendering the cooling device an automatic and coöperating unit of my curing system it is preferably actuated by the draft induced in the vent ducts. For this purpose both ends of the pipe 31 lead exteriorly of the curing compartment and connect with a cooling chamber 48 arranged above the compartment and containing a cooling tank 49 containing any suitable means for relatively reducing temperature. An air inlet pipe 50 and an air outlet pipe 51 connects with the pipe 31 on opposite sides of the cooling chamber, the outlet pipe leading to a vent duct so that the upward draft in the duct will act to draw air into pipe 31 through the inlet pipe and with the natural fall of the cold air from the cooling chamber set up a circulation of air through the cooling chamber and pipe 31. The air passing through pipe 31 being colder than that entering the curing compartment absorbs heat from the incoming air and has a chilling action thereon.

Articles of diet such as meat, fruit, and vegetables on being placed in the curing compartment and subjected to the action of the heat and moisture for a sufficient length of time will be rendered devoid of the water element with little or no loss of the flavor constituents. Articles so treated will keep indefinitely without fermentation or decomposition and may be restored to substantially their natural characteristics by immersion in water or by being saturated with moisture in any appropriate manner.

I claim:

1. In a curing apparatus, a curing compartment, means for directing a current of cold air across the upper portion of said compartment to form a cooling zone, a heating chamber beneath said compartment, heating means in said chamber for causing heat carrying expanded moisture to rise in said compartment into said cooling zone and cause condensation and thereby causing a downward tendency, and means for drawing excess moisture-laden air together with impurities from the lower portion of said compartment to form an even moisture-laden air throughout said compartment below the cooling zone.

2. In a curing apparatus, a curing compartment having a side wall fresh air inlet in its upper portion and outlets opposite the inlet for directing a current of cold, moisture and oxygen laden air across the upper portion of said compartment, a heating chamber beneath said compartment, means for heating said chamber so arranged therein as to heat the floor of the curing compartment causing expansion by the absorption of heat radiating from the floor of the compartment of moisture laden air and causing this air to rise in said compartment to the cold incoming air current in the upper part of said compartment, and means for drawing air containing excess moisture laden with impurities from the lower portion of said compartment.

3. In a curing apparatus, a curing compartment, means for directing a cold moist air current across the upper portion of said compartment to form a cooling zone, a heating element arranged to heat the lower portion of said compartment, and means whereby said heating element will operate to draw excessive foul moisture-laden air from the lower portion of said compartment.

4. In a curing apparatus, a compartment having a side wall air inlet in the upper portion for admitting cool moist oxygen laden air, outlets opening into the upper portion of said compartment opposite the the air inlet, vent ducts, smoke flues, said outlets opening into said vent ducts and smoke flues, outlets opening from the lower portion of said compartment into said vent ducts and smoke flues, a heating element arranged to heat the floor and lower portion of said compartment, and means whereby said heating element will act to induce a draft of said oxygen laden air into and through the upper portion of said compartment and outlets and to draw foul laden air from, down and through the lower portion of said compartment.

5. In a curing apparatus, a curing compartment, an air inlet in the upper portion thereof, a combustion chamber, a set of superheating flues leading from the upper portion of said combustion chamber into the lower portion thereof, a floor separating said combustion chamber and curing compartment, preheating conduits leading from the lower portion of said combustion chamber and intersecting the superheating tubes, a heating element in said combustion chamber adapted to cause a pressure by expansion in the upper portion of said chamber causing products of combustion to be forced outward and downward from the upper portion of said chamber to the intersection of said conduits and tubes into contact with a cooler current of excess moisture and oxygen laden air to superheat same, and dampers in said conduits for regulating the volume of cool air admitted to the combustion chamber.

6. In a curing apparatus, a curing compartment, means for directing a current of cold air across the upper portion of said compartment to form a cooling zone, a heating chamber beneath said compartment, heating means in said chamber whereby heat may be caused to rise from the floor of said compartment into said cooling zone to condense moisture, and means for drawing excess moisture from the lower portion of said compartment.

7. In a curing apparatus, a curing compartment having a side wall fresh air inlet in its upper portion and outlets opposite the inlet for directing a current of cold air across the upper portion of said compartment, a heating chamber beneath said compartment, means for heating said chamber and the floor of said compartment whereby heat may be caused to rise in said compartment to condense moisture from the fresh air current entering the upper portion of said compartment, and means for drawing excess moisture from the lower portion of said compartment.

8. In a curing apparatus, a curing compartment, means for directing a current of cold air across the upper portion of said compartment to form a cooling zone, a heating element arranged to heat the floor of said compartment, and a conduit leading from the lower portion of said compartment to a point adjacent to said heating element for supplying air thereto whereby heat rising from said heating element will act to draw air and excess moisture from the lower portion of said compartment.

9. In a curing apparatus, a curing compartment, a side wall air inlet in the upper portion of said compartment for admitting moist cool air, vent ducts opening to the upper portion of said compartment opposite the air inlet and also opening to the lower portion of the compartment, a heating element arranged to heat the floor of said compartment, and means whereby hot products of combustion rising from said heating element will act to induce a draft in said vent ducts to draw air and moisture from the upper and lower portion of said compartment.

10. In a curing apparatus, a curing compartment, means for admitting moist cool air to the upper portion of said compartment, vent ducts opening to the upper and lower portion of said compartment, a heating chamber beneath said compartment, a smoke flue for carrying off hot products of combustion from said chamber, and communications between said vent ducts and smoke flue whereby heat rising in the latter will operate to draw air and moisture from the upper and lower portions of said curing compartment.

11. In a curing apparatus, a curing compartment, a heating chamber therebeneath, a flue connected to said heating chamber, and means whereby heat rising in said flue will draw air and moisture through said curing compartment.

12. In a curing apparatus, a curing compartment, a heating chamber therebeneath, a flue connected to said heating chamber, means whereby heat rising in said flue will draw air and moisture through said curing compartment, and means for delivering air from said compartment to said heating chamber constituting the only air ingress to said heating chamber.

13. In a curing apparatus, a curing compartment, having an imperforate floor and formed with side, end and top walls, a heating chamber beneath the floor of said compartment, a series of superheating tubes opening at their upper and lower ends to the upper and lower portions of said chamber, a heating element in said chamber between the ends of said superheating tubes, an air inlet in a wall of said compartment opening to the upper portion thereof, and conduits leading from the lower portion of said curing compartment to the lower portion of the superheating tubes constituting with said air inlet the only air ingress means to said chamber.

14. In a curing apparatus, a curing compartment having an imperforate floor and formed with side, end, and top walls, a heating chamber beneath the floor of said compartment, a series of superheating tubes opening at their upper and lower ends to the upper and lower portions of said chamber, a heating element in said chamber between the ends of said superheating tubes, an air inlet in a wall of said compartment opening to the upper portion thereof, conduits leading from the lower portion of said curing compartment to the lower portion of the superheating tubes constituting with said air inlet the only air ingress means to said chamber, and smoke flues communicating with said chamber and with the upper and lower portion of said curing compartment.

15. In a curing apparatus, a curing compartment having an imperforate floor and formed with side, end, and top walls, a heating chamber beneath the floor of said compartment, a series of superheating tubes opening at their upper and lower ends to the upper and lower portions of said chamber, a heating element in said chamber between the ends of said superheating tubes, an air inlet in a wall of said compartment opening to the upper portion thereof, conduits leading from the lower portion of said curing compartment to the lower portion of the superheating tubes constituting with said air inlet the only air ingress means to said chamber, smoke flues connecting with said chamber and with the upper and lower portions of said curing compartment, and vent ducts opening at their upper ends to the smoke flues and communicating with the upper and lower portions of said curing compartment.

16. In a curing apparatus, a curing compartment, a cooling element in the upper portion of said compartment, means for directing a current of fresh air across the upper portion of said compartment around said cooling element to form a cooling zone, a heating chamber beneath said compartment, heating means in said chamber whereby heat may be caused to rise from the floor of said compartment into said cooling zone to condense moisture, and means for drawing excess moisture from the lower portion of said compartment.

17. In a curing apparatus, a curing compartment, an air inlet in the upper portion of said compartment, outlets opposite said air inlet, and means for inducing a current of fresh air across the upper portion of said compartment through said inlet and outlets.

18. In a curing apparatus, a curing compartment, an air inlet in the upper portion of said compartment, outlets opposite said air inlet, means for inducing a current of air across the upper portion of said compartment through said inlet and outlets, a tube interposed between said air inlet and outlets, and means for circulating a cooling medium through said tube.

19. In a curing apparatus, a curing compartment having an air inlet in the upper portion thereof, a vent duct communicating with said compartment opposite the air inlet, a cooling tube in the upper portion of said compartment communicating with said vent duct, and a refrigerant chamber communicating with said cooling tube having an air inlet, said tube communicating at its opposite end with said vent duct whereby the latter will operate to induce a flow of air through said refrigerant chamber and cooling tube.

ELMER PEMBERTON.